May 30, 1967 W. C. DAUSER 3,322,025

COLOR CONTROL METHOD

Filed May 17, 1962

6 Sheets-Sheet 1

INVENTOR.
WILLIAM C. DAUSER

BY Price & Heneveld

ATTORNEYS

May 30, 1967 W. C. DAUSER 3,322,025

COLOR CONTROL METHOD

Filed May 17, 1962 6 Sheets-Sheet 2

INVENTOR.
WILLIAM C. DAUSER
BY Price & Heneveld
ATTORNEYS

INVENTOR.
WILLIAM C. DAUSER
BY Price & Heneveld
ATTORNEYS

May 30, 1967 W. C. DAUSER 3,322,025

COLOR CONTROL METHOD

Filed May 17, 1962 6 Sheets-Sheet 4

INVENTOR.
WILLIAM C. DAUSER
BY Price & Heneveld
ATTORNEYS

May 30, 1967 W. C. DAUSER 3,322,025

COLOR CONTROL METHOD

Filed May 17, 1962 6 Sheets-Sheet 5

INVENTOR.
WILLIAM C. DAUSER

BY Price & Heneveld

ATTORNEYS

INVENTOR.
WILLIAM C. DAUSER
BY Price & Heneveld
ATTORNEYS 3,322,025
COLOR CONTROL METHOD
William C. Dauser, 458 Melody Lane,
North Muskegon, Mich. 49445
Filed May 17, 1962, Ser. No. 195,501
4 Claims. (Cl. 88—14)

This invention relates to color analyzing, variation and control methods, and more particularly to methods of balancing color components of a composite color source, especially in relation to control of primary color components of a light source for photographic processes.

The inventive color control method involved is useful in many fields which utilize color analysis, color projection, color standardization, color comparison, etc. Since its chief use presently is in color photography, and since it was primarliy developed for color photography, the details of the method will be explained largely in relationship to this particular field for purposes of convenience. Once the principles involved are set forth, potential uses in other fields will be readily appreciated by those in the art.

In color photography there is a maxim that the reproduction of all colors in a print should be "equally bad." In other words, the colored photographic representation of images formed by the cooperation of three separate color sensitive layers of the photogarphic print should not be outstandingly good in one of the three primary colors, while being relatively poor in the other. The colors should be consistent with each other in quality. This is best achieved by complete color balance between the three primary colors used to form the many variety of colors by various mixtures. The need for this complete color balance is readily acknowledged by those in the art, but even fairly good color balance is achieved only with considerable effort, expense, trial and error methods, and sacrifice of other desirable qualities in a photographic print. Further, with the best available equipment today, some color balance is achieved only by using as a "standard" a previously made print which is arbitrarily chosen as the best available to that particular photographer. Consequently, the prints subsequently produced can never be better than the previous print used as the "standard."

The common method of achieving some semblance of color balance using a three layer, dye-coupling type paper, commonly known as "Type C" paper, is to combine subtractive dye filters together in various combinations in efforts to control the amount of red, green and blue light transmitted from the primary white light source in a typical enlarger, through the negative film, unto the printing paper. Since dye filters inherently absorb large amounts of light, and since different color filter dyes absorb different amounts of light, a true balance of transmitted light for optimum exposure cannot really be achieved. Further, use of subtractive filters is relatively limited since neutral density, which detracts from print quality, is introduced with liberal use of the filters.

Heretofore, no really accurate, convenient method of exactly analyzing and then controlling optimum exposure for each primary color in relationship to the density of the other primary colors has been available. Color analysis has always been dependent upon using the arbitrarily selected "standard" negative, which hopefully contains not too much or too little of the particular tone area thought most important (e.g. "flesh" tone). It is also dependent upon selection of the proper areas of this negative.

After this analysis is made with prior equipment, efforts to control a photographic print in accordance with this analysis require the use of a filter combination carefully reproduced in the printer-enlarger. This entire process is time-consuming, tedious, and complicated, and even then the analysis is only relative and the reproduction questionable.

Also, with these prior methods, undesirable "side band exposure" often occurs due to exposure of the print paper to light wave lengths other than red, green and blue. Moreover, even if some general color balance relationship is finally established after a series of trial and error printing sequences, this cannot be quickly and accurately altered to give optimum balance conditions for different tone ranges, for example, pastel shades. Instead the entire sequence of steps must again be followed.

Thus, briefly, no method of exact analysis, enabling accurate color balance control, not limited by an arbitrarily selected negative, and enabling printing with the same equipment without change of the set-up, has been available.

It is therefore an object of this invention to provide a unique and exact method of analyzing values of primary colors transmitted through a color film. This exact analysis is achieved independent of prior negatives, by a direct correlation of the exposure and density characteristics of the primary colors projected through the film.

It is another object of this invention to provide a unique method of both analyzing and controlling these primary components to obtain optimum color balance conditions without use of filters in the image path. The same apparatus is used for both analysis and printing or reproduction without physical changes in the equipment set-up, but only by changes in electrical controls.

It is another object of this invention to provide a method of controlling the amount of each primary color component in a light source to obtain optimum color balance, enabling one to produce a high quality print even from a poor negative. Moreover, the optimum balanced conditions may be achieved as a general relationship between the three colors, or may be quickly and easily varied to achieve closely balanced conditions in a particular color intensity range, such as pastel shades, high saturation colors, or any other particular region of color intensity as desired.

It is another object of this invention to provide a method of exactly analyzing and accordingly controlling the exposure characteristics of three primary color light beams to be projected through a film unto photographic print paper having three layers sensitive respectively to these primary color beams.

It is another object of this invention to provide a method of analyzing and controlling balance of the three primary color light beams transmitted through a negative unto a photographic print paper in accordance with an analysis of exposure by the three color beams through the negative film as measured by density of the film, and adjustment of this exposure to optimum correlation between the three colors. Thus, a proper color balance between the three primary colors can always be achieved to suit the particular photographic negative and print paper involved.

It is another object of this invention to provide a method of control of the tristimulus values of primary color components of a light source to obtain optimum balanced conditions for a particular application.

It is another object of this invention to provide a method of determining, analyzing, and controlling the exposure of a photographic print paper to separate, primary light components of a light source by correlating graphical density plots of selected areas of a film for each color with the amount of exposure of each color on the negative. The graphical plots utilized show curves commonly known as H and D curves. Accurate adjustment of the amount of the three separate primary color beams which are combined to form a controlled source, is governed by the analysis made with the same variable color sources. This enables complete correlation between the analysis equipment and the printing equipment since the same variable color light sources are used for both.

It is still another object of this invention to provide a method of exactly reproducing any chosen color. Moreover, any other color in the entire visible range may be accurately and exactly reproduced any number of times from a standard color, no matter what color the standard. In fact, the entire range of spectral colors having unlimited tone and hue variations may be accurately and repeatedly reproduced, even using a standard gray as the determining factor.

It is another object of this invention to provide a control circuit for a light source having red, green and blue sources which are adapted to operate independently or in combination, which circuit has separate voltage meter adjustment means for light detected by a phototube and reflected on a voltmeter, to obtain exact linear relationship between the light and the voltage reading for each of the sources.

These and many other objects of this invention will be apparent upon studying the following specification in conjunction with the drawings in which.

Figure 1:
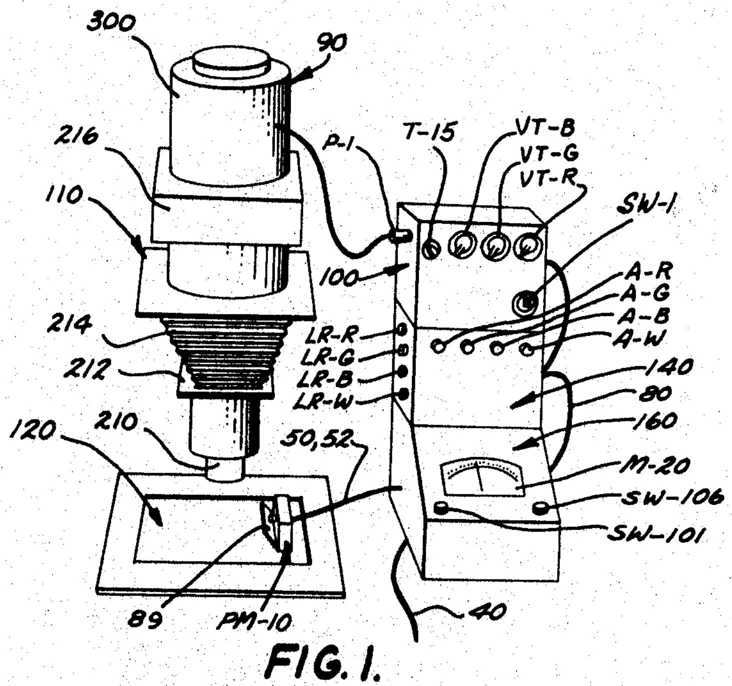
FIG. 1 is a perspective view of a printer-enlarger apparatus upon which the novel method may be practiced.
Figure 5A:
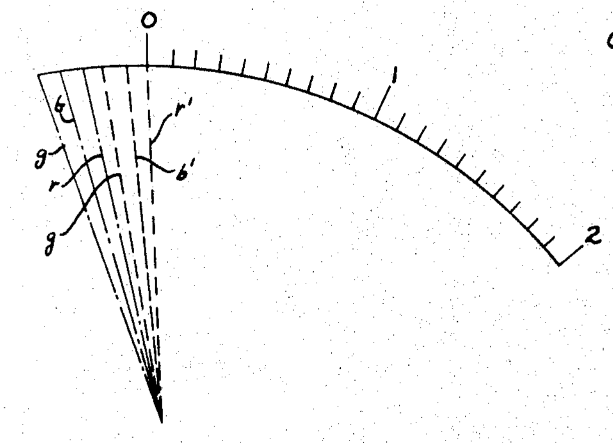
Figure 5B:
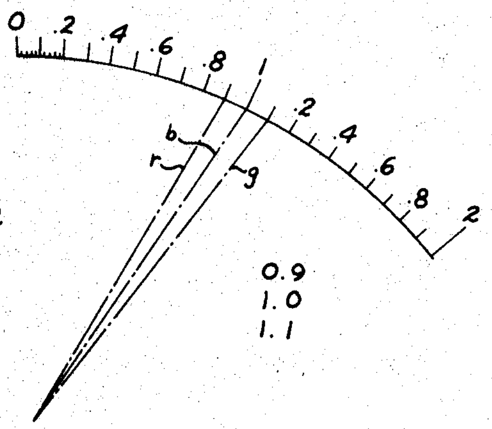
Figure 5C:
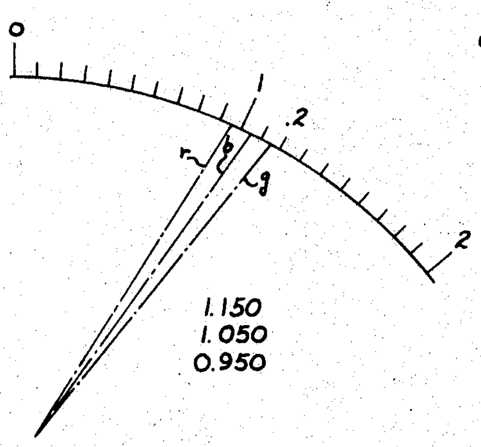
Figure 5D:
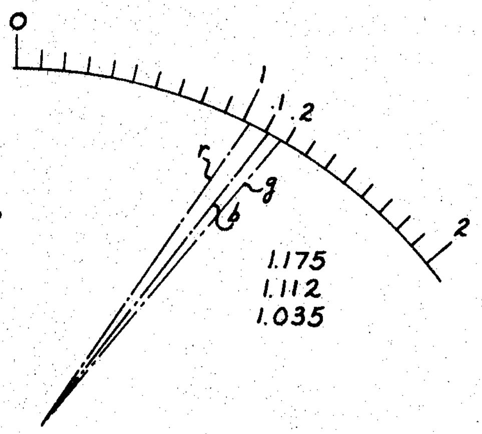
Figures 6A, 6B, 6C, 6D:
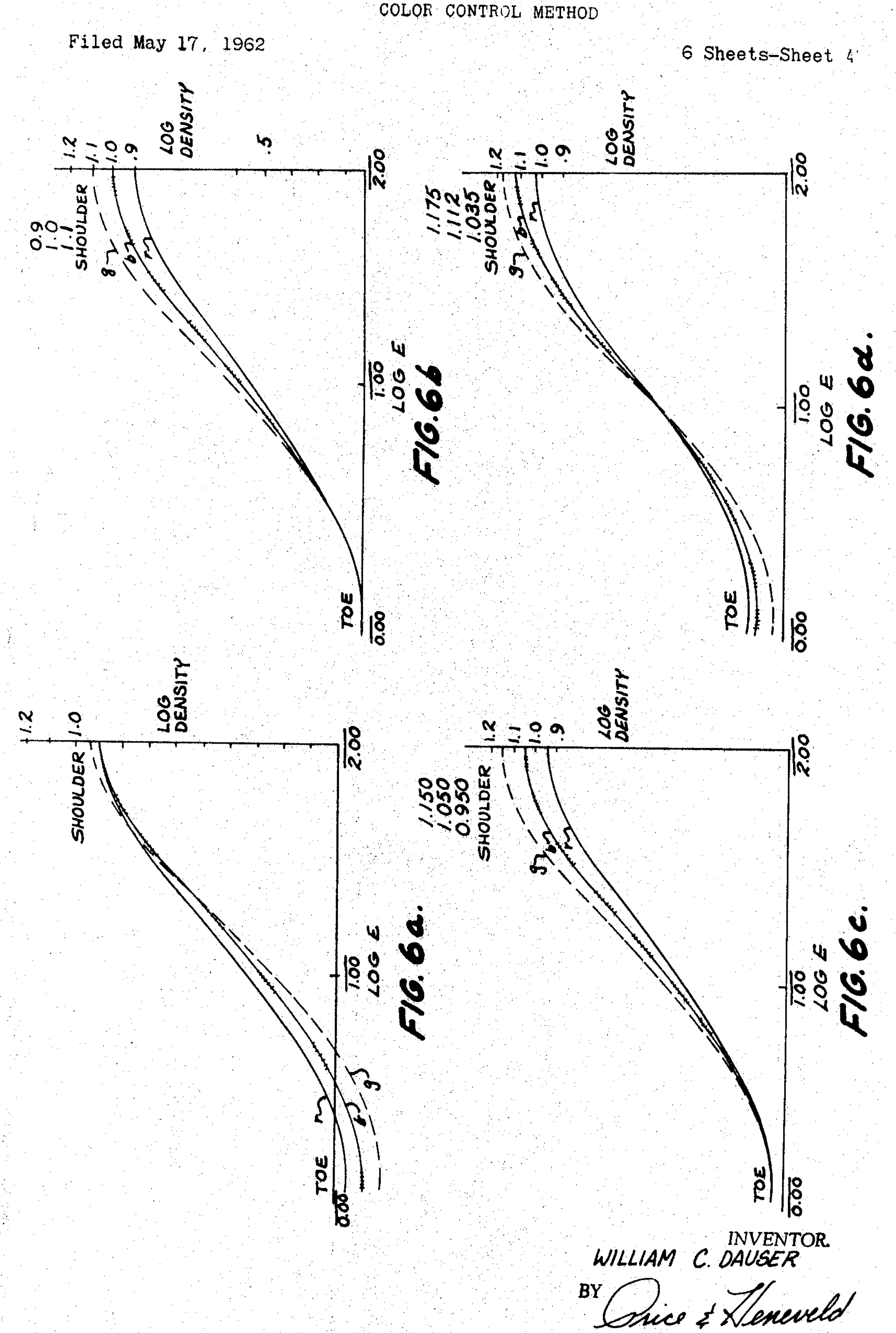
Figure 7:
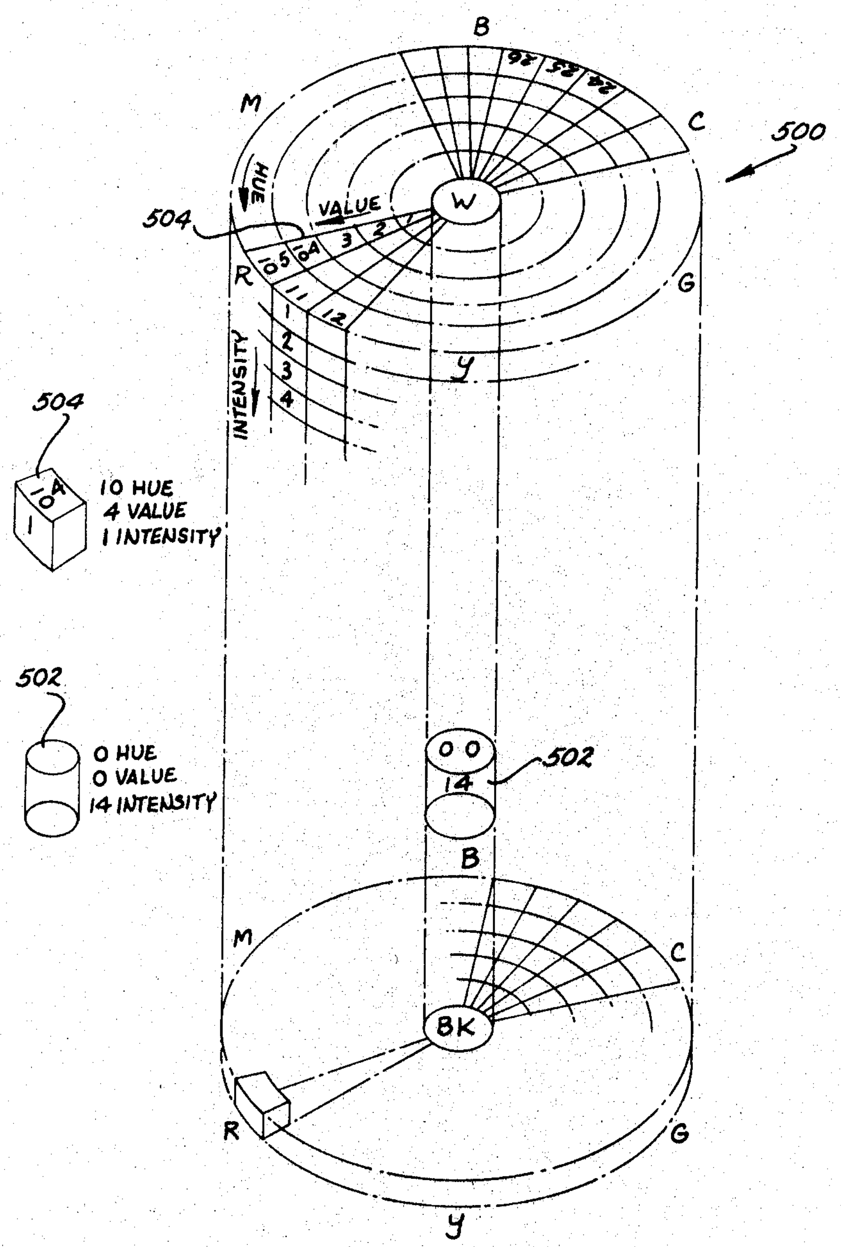
Figure 8:
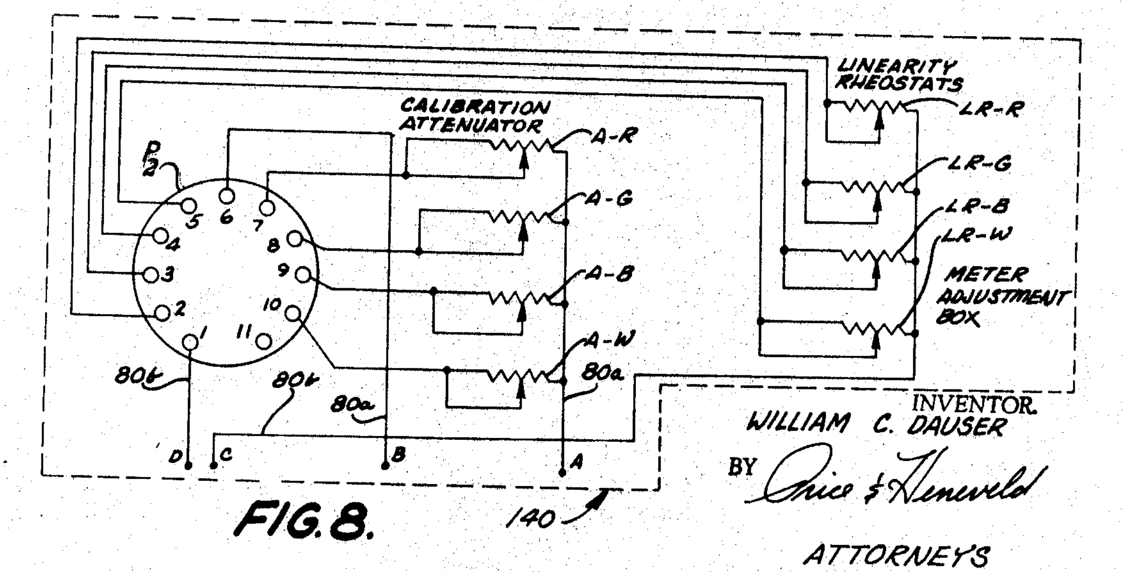

FIG. 5*a* is a representation of the instrument scale in FIG. 1 showing three light area shadow density readings of a film for the three primary color beams at the beginning of the color analysis;

FIG. 5*b* illustrates the scale showing three high light area density readings of a film during the second step of the analysis;

FIG. 5*c* illustrates the scale showing three high light area density readings after simultaneous adjustment of the light intensities by stopping down the lens diaphragm opening;

FIG. 5*d* illustrates the scale showing the high light area density readings after final adjustment of the individual intensities of two of the light sources to obtain maximum color balance of composite light transmitted through the film;

FIGS. 6*a, b, c* and *d* are graphical plots of H and D curves during steps of the method corresponding to the readings in FIGS. 5*a–d*;

FIG. 7 is a perspective view of a three-dimensional, cylindrical color chart which makes the method more convenient to practice, and which can comprise a standard color chart using this method;

FIG. 8 is a circuit diagram of the meter adjustment box equipment; and

Figure 9:
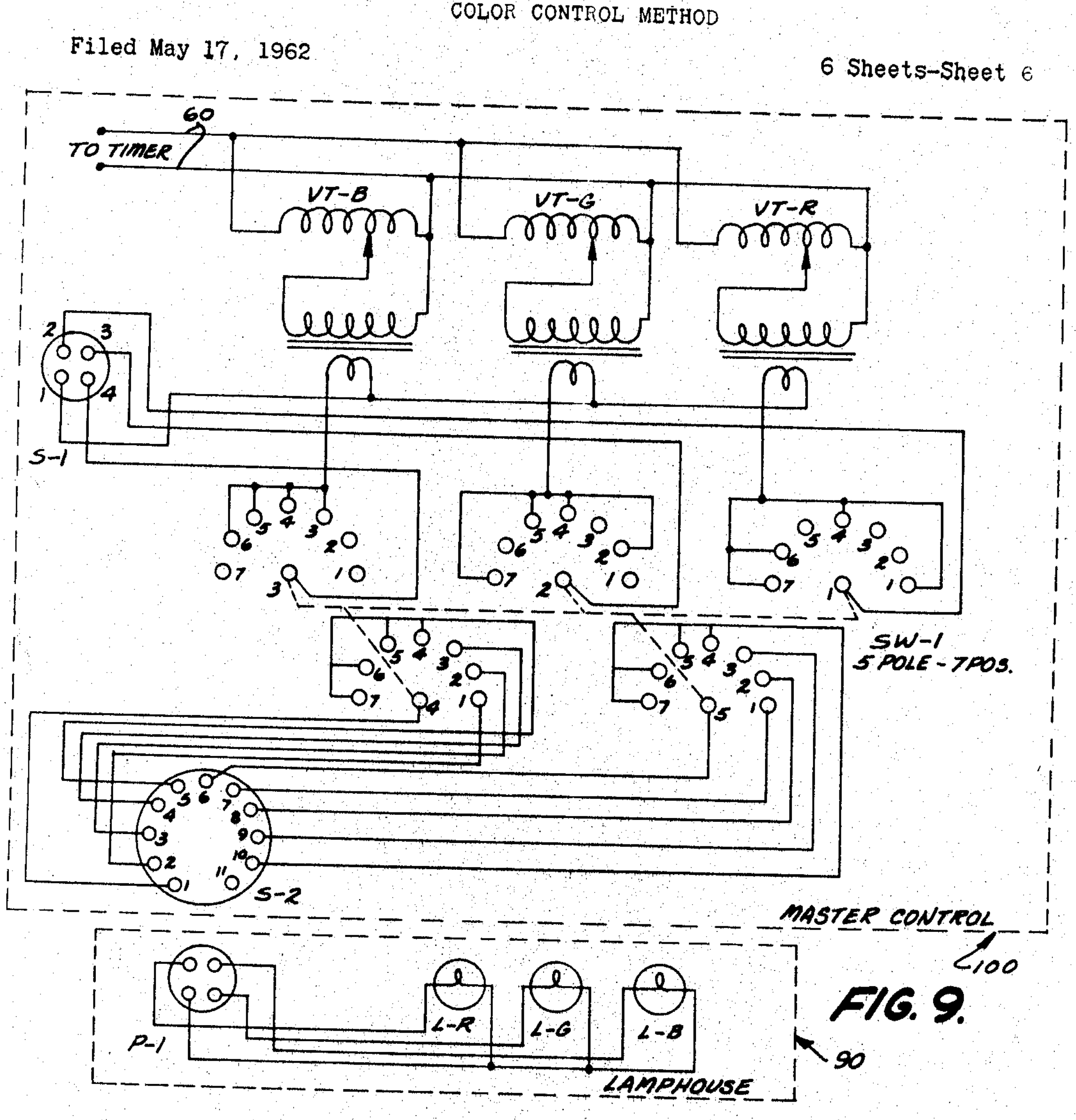

FIG. 9 is a circuit diagram of the master control.

Basically, this invention comprises a method of analyzing and controlling exposure by light composed of three primary colors, transmitted through a film, to obtain optimum color balance of the transmitted light, and comprising the steps of (1) projecting red, green and blue lights successively unto the film, (2) measuring the high-light and light area densities of the projected image, for each of these colors to analyze the amount of each light transmitted through the film, (3) adjusting the amount of the different color lights projected on the film to obtain optimum color balance of light transmitted through the film, and (4) then projecting said adjusted red, green and blue light simultaneously, to thereby transmit light with optimum balance through the film, to enable printing by exposure of printing paper to said transmitted light.

More specifically, the adjustment occurs by first measuring the density of each of the three colors in the light areas and correlating these readings to the toes of three H and D curves for the transmitted colors, individually adjusting the amount of projected light of two of these colors to cause the three simulated density readings to be substantially the same to thus align the toes of the curves, measuring the density of the three colors in a high light area of the film, and correlating these readings to the shoulders of the H and D curves, adjusting the input and output of the three lights to cause optimum color balance between the three colors as represented by a crossing of the H and D curves in a particular exposure region, and then projecting through the film the composite light composed of the combined adjusted red, green and blue lights.

The invention also comprises a control circuit for the three primary color light adjustments and linear adjust means in the photo-multiplier circuit providing density reading on a poltage meter in inverse relationship to the light transmitted, to cause the meter to vary linearly with the changing density of each of the three primary colors, as well as the composite color formed of the three.

Referring now to the drawings, there is depicted the preferred form of apparatus with which the inventive method may be practiced, and also the inventive control circuit used with this apparatus. Basically, the complete apparatus comprises a color lamphouse 90, mounted upon a conventional printing and enlarger head 110 above an easel 120, a photo-multiplier probe PM–10, a density meter M–20 which is essentially a voltage meter, a meter adjustment box 140 and a master control 100.

Figure 2:
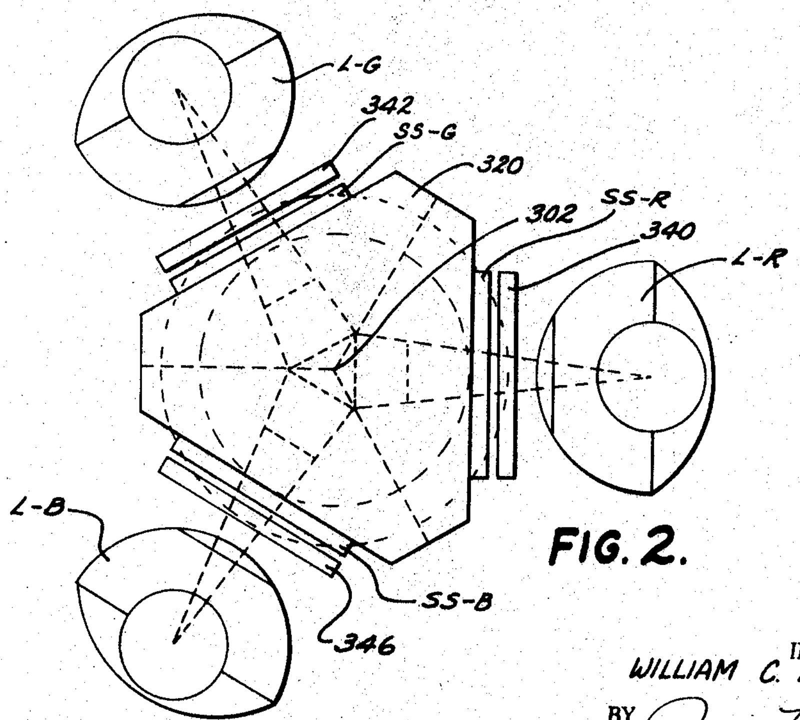
FIG. 2 is a plan view of the optical system of the apparatus.
Figure 3:
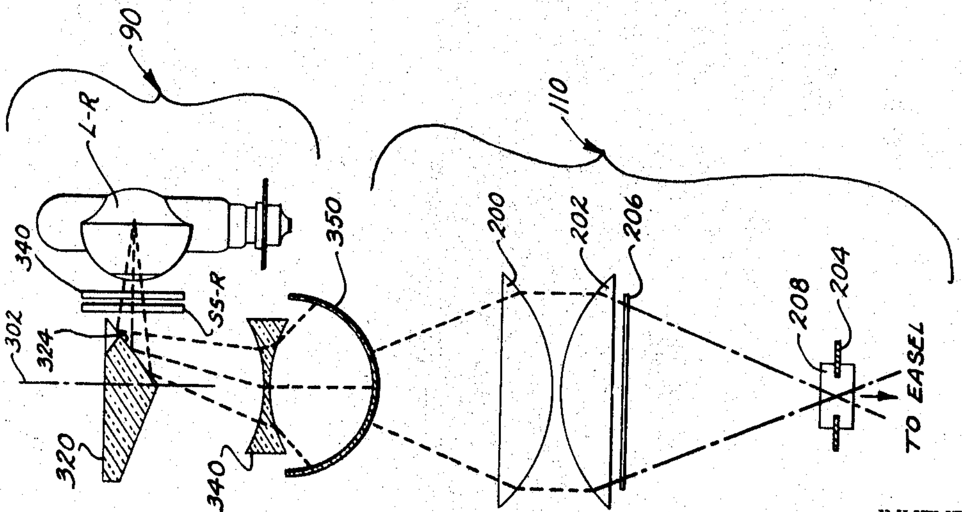
FIG. 3 is a front elevational schematic view of this optical system.

The color head and enlarger are shown more specifically in FIGS. 2 and 3. The enlarger is of a conventional type including a pair of condensor lenses 200 and 202. Beneath the condensor lenses is a color film 206 which is to be analyzed. Beneath film 206 is a conventional enlarger lens 208 which directs light downwardly to easel 120 (FIG. 1) and has a diaphragm 204. The enlarger lens 208 may be mounted in a conventional holder 210 (FIG. 1). The holding means for film 206 may comprise a suitable platform 212 of a conventional type below bellows 214. The condensor lenses 200 and 202 may be adjustably mounted to provide the conventional variable condensor action in housing 216.

The lamphouse 90 is of a novel type and is claimed in my co-pending application entitled Color Head, Ser. No. 195,476, filed May 17, 1962, now Patent No. 3,227,040. This color lamphouse includes a suitable outer housing 300. Mounted around a central axis 302 in this housing are three high intensity light sources L–R, L–G and L–B. These light sources possess small angle outlet openings directed toward axis 302 so that the light is projected generally perpendicularly to axis 302 as illustrated in FIG. 2. Each of these lamps is capable of projecting a high intensity white light beam with an angle of 15° or less. The preferred lamp is a Phillips lamp No. 13113C/04. Each of these lamps provides a primary source of white light as will be understood.

Located on axis 302 is a triple face mirror 320 that is ground from a block of Pyrex or other suitable material. It basically resembles a three sided pyramid with the point being downwardly directed and on the axis 302. Each of the three faces 324 is coated with a mirror coating. The angles of incidence of the three faces are determined by the beam angle of the lamp and the length of the projection system. The angles of incidence of the particular system illustrated are 37°30′ to cause the three beams to coincide upon negative lens 340, also located on axis 302.

Between each of the lamps L–R, L–G and L–B and its respective mirror face 324 is placed a multifilm spectral selector SS–R, SS–G and SS–B. Spectral selector SS–R allows only red light to pass therethrough, while reflecting all other wave lengths in the normal visual spectrum of about 400 to 700 millimicrons. Spectral selector SS–G allows only green light to pass. Spectral selector SS–B allows only blue light to pass. It has been found that the unique combination of these high intensity, narrow beam lamps with these multifilm spectral selectors achieves sufficient light transmission to enable the spectral selection separation of the three primary colors, red, green and blue, and subsequent reformation thereof into a pure white light composed of only these primary colors with sufficient intensity for photographic enlarging purposes. This combination is claimed in my co-pending application identified above. Each of these multifilm spectral selectors is composed of a transparent base such as quartz or glass, upon which is coated a multiple of coatings of rare earth metals with a total thickness of no greater than 40 microinches usually. These multiple coatings are placed one upon another directly without any intermediate material being placed therebetween. These multifilm spectral selectors have exceptionally high transmittence and small losses and define the desired spectral band with concerned with excellent sharpness. These are placed perpendicular to the central axis of the light beams projected towards the three mirror faces as illustrated in FIG. 2. The multifilm spectral selectors which have been found to work exceptionally well are those marketed by Bausch and Lomb and identified as Red selector 90–2–600 as coupled with 90–2–540, Green 90–4–540 as coupled with 90–2–480, and Blue 90–1–480 as coupled with 90–1–540. In each case, the first number identifies the angle of incidence, i.e. the 90° angle as illustrated in FIGS. 2 and 3. The second number is a Bausch and Lomb design designation. The third number defines a functional wave length. If the spectral selector has a single cut-off which must be defined, this number is the wave length in millimicrons at the 50% transmittence point on this cut-off. This for example holds true on the blue multifilm selector which selects even wave lengths below the visible range of about 400 millimicrons (ultraviolet). This holds true also for the red selector which includes wave lengths above the visible range limit of about 700 millimicrons (infrared). The green filter, on the other hand, since it falls in the middle of the visible range from 400 to 700 millimicrons wave length, possesses two cut-offs. Its third number refers to the wave length at the center of the band transmitted.

Preferably, heat absorbers 340, 342 and 346 are also placed in the white light beam path from each of the lamps adjacent the spectral selectors.

It will be realized that the three faces 324 of the mirror 320 reflect the three primary colors red, green and blue unto the negative lens 340. The combined three primary colors are directed into the hemispherical opal diffusor 350 which combines the three primary colors to form a second light source, or variations thereof depending upon the intensity of each primary color projected into the opal diffusor. In other words, if equal amounts of the three primary colors are projected unto the diffusor, white light will project from opal diffusor 350. This diffusor thus acts as a primary source for the enlarger apparatus even though it comprises a secondary source composed of the three primary color components. In fact, it has been found that if a conventional white light bulb is removed from the conventional enlarger, and the lower portion of the bulb is cut-off and utilized for the opal diffusor 350, and then the head 90 is mounted upon the conventional enlarger, the apparatus can be operated without any major modifications being made in the enlarger apparatus. Yet, instead of the conventional white light being used as the primary source, which projects all colors of the spectrum in an uncontrolled purity and in a non-variable manner, there is substituted an enlarger primary source composed of head 90 which has extreme purity variability. It can produce any desired color, and further enables accurate analysis and control of the light passed through the film 206 in a manner to be described hereinafter.

The voltage input for each of the light sources L–R, L–G and L–B is independently controlled by variable transformers VT–B, VT–G, and VT–R, respectively, as illustrated in FIG. 9. In FIG. 1, the dials controlling the variable transformers are illustrated on master control 100. These dials therefore allow control of the voltage input and intensity output of each lamp. Moreover, general control switch SW–1 which is a five pole, seven position switch enables any one, two or three of the three lamps to be operated simultaneously. The dial for the switch SW–1 is illustrated in FIG. 1. The circuitry for the switch is illustrated in FIG. 9.

Power for the entire apparatus is obtained through line 40 (FIGS. 1 and 4) as controlled by main on-off switch SW–101. The alternating power input is rectified by rectifier 400 mounted in housing 160 of meter M–20. Power from the rectifier 400 is fed to amplifier 402 also mounted in meter housing 160. Any signal from amplifier 402 is eventually registered on voltage meter M–20, which is calibrated in terms of "density" for reason to be explained hereinafter. The value of the voltage signal sent to meter M–20 is determined by the photo-multiplier tube PM–10 which obtains power for operation from rectifier 400 through line 50. Photomultiplier tube PM–10 essentially comprises a probe which can be placed upon easel 120 beneath the enlarger and printer apparatus 110 to detect the amount of light projected unto the easel at certain portions thereof. Thus, by movement of the photo-multiplier tube around on the easel, varying amounts of light will fall on the probe mirror 89 and be reflected into the probe, depending upon how much of the light is transmitted through the different areas of the film 206. The voltage signal across the photo-multiplier tube varies with the light and travels through line 52 to control the grid of amplifier tube 402. This controls the signal across the amplifier tube so that the voltage output of the amplifier varies inversely with the amount of light projected onto mirror 89 of the photo-multiplier tube. Thus, the voltage reading registered on meter M–30 will be in inverse relationship to the amount of light passed through the film unto the easel 120. Since the amount of light transferred through the film varies inversely with the density of the particular area of the film involved, the voltage signal on meter M–20 will be in direct proportion to the density of the film area. The density of any area depends upon the original exposure of that area of the film. The greater the exposure, the greater will be the amount of developed dye and free silver in that area, thus creating a greater density and lower light transmission therethrough.

Switch SW–106 cuts the photo-multiplier tube PM–10 into and out of the circuit as desired. The amplifier circuit includes a suitable conventional feedback 440 for reducing the distortion generated by the amplifier. Beyond the amplifier 402 is control switch SW–1 which correlates the selection of one, two, or three lamps L–R, L–G and L–B either singly, or in some combination as desired. It also correlates each lamp with its respective attenuator rheostat and linearity rheostat as explained hereinafter. To complete the circuit, the meter M–20 is also connected to ground G.

The attenuator rheostats A–R, A–G, A–B and A–W essentially comprise instrument calibrating attenuators in series with meter M–20 to enable the meter to be adjusted for sensitivity, and for "zeroing in" the meter for each of the respective lamps, red, green, blue and white (total of red+green+blue). The linearity rheostates LR–R, LR–G, LR–B, and LR–W are connected in parallel across the meter. These also enable calibration of the meter to cause an exact linear relationship of the meter reading in terms of the inverse of the light transmitted through film 206 in the enlarger. The provision of these four linearity adjustment rheostats and the four attenuator rheostats enables applicant's unique apparatus to operate effectively for his method.

Figure 4:
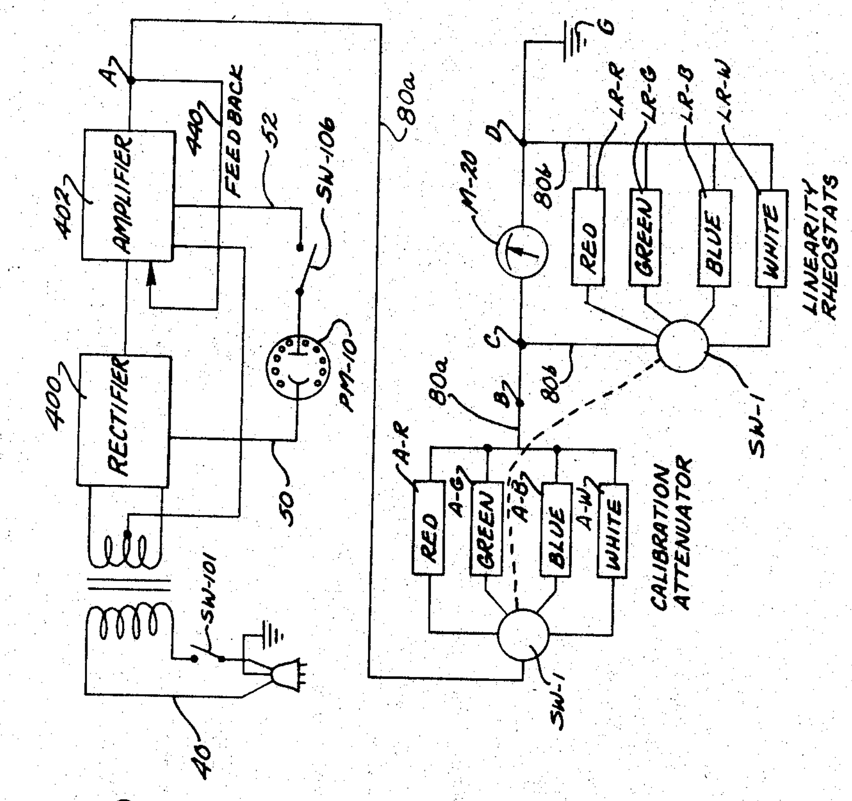
FIG. 4 is a schematic block diagram of the electrical circuitry involved with this apparatus and method.

The attenuator rheostats and linearity rheostats shown in block diagram form in FIG. 4 are shown more specifically in FIG. 8. It will be noted that the terminals D and C in FIG. 8 correspond to terminals D and C in FIG. 4, and that terminals A and B in FIG. 8 correspond with terminals A and B in FIG 4.

The five pole, seven position switch SW–1 correlates the respective attenuators, lamps, and linearity rheostats. More specifically, when switch SW–1 is in position No. 1, variable transformer VT–R and lamp L–R (red) are in circuit through pin and socket connection 2 on plug P–1 and socket S–1. Also, at the same time, variable attenuator rheostat A–R for the red lamp is in the active position of the circuit by pin and socket connection 7 of plug P–2 and socket S–2, and pole No. 5 of switch SW–1. Linearity rheostat LR–R for red light source L–R is also in circuit through pole No. 4 of the switch and through pin and socket connection 2 of switch S–2 and plug P–2.

When switch S–1 is moved to the second position, bulb L–G (green) as well as variable transformer VT–G are in circuit through pin and socket connection 3 of socket S–1 and plug P–1. Simultaneously, attenuator adjust rheostat A–G is in circuit through pin and socket 8 of plug P–2 and socket S–2, and through pole 5 of switch SW–1. Linearity rheostat LR–G is in circuit through pole 4 of switch SW–1, and pin and socket connection No. 3 of plug P–2 and socket S–2.

In a similar manner, bulb L–B, variable transformer VT–B, attenuator rheostat A–B and linearity rheostat LR–B are in circuit together in position 3 of switch S–1. In position 4 of switch SW–1, all of the lamps and their respective controllers and signal modifiers are actuated. Therefore, lamps L–R, L–G and L–B, variable transformers VT–R, VT–G and VT–B, attenuator A–W (white), and linearity adjust LR–W are all in circuit. In position 5 of switch SW–1, the green and blue sources are both actuated, as well as their variable transformers, attenuator rheostats and linearity rheostats. In position No. 6 of switch SW–1, colors red and blue are activated, including their lamps, variable transformers, attenuators, and linearity rheostats. In position No. 7 of switch SW–1, colors green and red are simultaneously activated, including their variable transformers, attenuator rheostats, and linearity rheostats. Thus, it will be readily realized that a basic selection of colors include red, green, blue, red+green+blue (white), red+green (cyan), blue+red (magenta) and green+red (yellow).

Moreover, by varying the individual variable transformers VT–B, VT–G and VT–R, the primary color components which combine to form the composite color projected from opal diffusor 350 can be varied in an unlimited manner to produce any color of any hue, a value or intensity combination. The number of different colors which can be produced is only limited by the human ability to visually distinguish between different colors since the variation of the three variable transformers is practically infinite.

Referring to FIG. 7, it will be seen that the color head makes possible a novel color chart which can serve as a standard and as a basis of conveniently classifying the colors which are achieved by this apparatus and method. More specifically, color chart 500 essentially approaches a cylinder in configuration. Around its circumference are arranged the three additive colors, red, blue and green, and the three colors normally regarded as subtractive colors, magenta, cyan and yellow. Thus, the chart varies in hue circumferentially. It varies in value radially across the cylinder and varies in intensity over the height or length of the cylinder. The central axis of the cylinder represents achromatic light ranging from absolute white at the top to black at the bottom with a range of grays in between. The segments of color near the top of the cylinder will be of pastel shades, while deep dark colors occur near the bottom. With these three variations of hue, value and intensity, the cylinder can be divided up into tiny segments which have specific indicia identifying its radial position for varying value, its circumferential position for varying hue, and its height position as varying intensity. Of course, these divisions illustrated as 1, 2, 3 and 4 etc. in the diagram shown, are merely arbitrary, since this number may be varied a great deal. If a gray segment 502 were selected out of the center of the cylinder, it would have a hue of zero, a value of zero, and an intensity of 14. Or if a segment 504 were selected near the top of the cylinder, it could have a value of 4, a hue of 10, and an intensity of one, thereby resembling a light pastel pink.

It should be understood that the combination of any three colors equally spaced on the circumference of the cylinder will form achromatic light. Further, it should also be understood that although throughout this disclosure, this invention is explained with reference to a "negative" which comprises magenta, cyan and yellow layers which are repsectively responsive to red, green and blue light, this invention could just as well as used and explained with reference to a "positive" without departing from the novel method and apparatus. Moreover, the use of the term "film" encompasses not only photographic film but colored microscope slides which can be utilized for many purposes of this invention. The significance of this color chart will become more apparent upon studying the following description of the novel method of evaluating and reproducing colors as set forth below.

*Method*

In practicing the novel method of this invention, power is supplied to the apparatus illustrated in FIG. 1 by plugging cord 40 into a suitable electrical outlet. Cord 80 (lines 80*a* and 80*b*, FIGS. 4 and 8) and plug connection P–1 and S–1 (FIG. 8) interconnect the components. Next, switch SW–101 is closed to provide alternating power to rectifier 400. The rectified current is supplied to the amplifier 402. It is also supplied to the cathode of the photo-multiplier tube PM–10 which is a part of the probe PM–10 on the easel 120 of the enlarger apparatus 110. Switch SW–106 connects the photo-multiplier tube PM–10 into the circuit to control the grid on amplifier 402. If no light is falling on the photo-multiplier tube, the voltage signal from the amplifier through the seven position, five pole switch SW–1 and through the attenuator rheostats A–R, A–G, A–B and A–W to meter M–20 is such as to make the meter M–20 register zero.

Before the negative 206 is inserted, the voltage meter M–20 which measures the density according to a voltage signal, is calibrated. It is calibrated for each color red, green and blue, and for white light. The meter is "zeroed in" under conditions of no light transfer through the optical system into thep robe PM–10 by adjustment of the respective attenuator rheostats A–R, A–G, A–B and A–W when the respective light red, green, blue and white are projected into the probe. The colors are selected by manipulation of switch S–1 from positions 1 (red); 2 (green); 3 (blue) and 4 (white).

Next, the meter is adjusted to cause the density readings to be exactly linear with respect to the change in light passing through the optical system. Thus, switch SW-1 is again placed through positions 1, 2, 3 and 4 to adjust the respective rheostats LR–R for red, LR–G for green, LR–B for blue, LR–W for white to enable accurate analysis to be later made.

When switch SW–1 is placed in position 1, bulb L–R is activated to project a narrow, high intensity beam through heat absorber 40 and spectral selector SS–R which allows only red light to pass and be reflected from mirror surface 324. The red light beam passes through negative lens 340 unto opal diffusor 350. This red light then passes through condensor lenses 200 and 202, through enlarger lens 208 and down unto the easel where it strikes the photo-multiplier tube probe PM–10. A mirror 89 on this photo-multiplier tube housing reflects the light into the tube. The voltage signal output from this tube controls the grid of amplifier 402 to cause the voltage signal from the amplifier to be inversely proportional to the amount of light picked up by the probe. Thus, the greater the light projected into the probe, the smaller the signal on M–20 will be.

More specifically, with full intensity red light shown through the optical system onto the probe, the meter M–20 is adjusted to zero by adjustment of variable rheostat A–R of the attenuator. In order to adjust the linearity of the system, variable transformer VT–R for bulb L–R is moved to a given intensity and negative of predetermined density, varying from low to high, are one by one inserted in the apparatus and each time the meter reading is noted and the rheostat LR–R adjusted. Adjustments of rheostat LR–R enables meter M–20 to read exactly linearly in inverse proportion to the amount of light passed through the optical system.

Next, switch SW–1 is placed in position 2 to activate lamp L–G (green), variable transformer VT–G, attenuator rheostat A–G and linearity rheostat LR–G. The zero point of meter M–20 is regulated by rheostat A–G. The linearity is adjusted with LR–G rheostat while varying transformer voltage through transformer VT–G. This is again repeated bulb L–B for the blue color when switch SW–1 is placed in position 3. Attenuator AR–B is adjusted, and linearity rheostat LR–B. This is repeated again with white light when switch SW–1 is in position 4 to simultaneously project red, green and blue. Adjustment is made in attenuator rheostat A–W and linearity rheostat LR–W. It will be realized that these adjustments for calibration are required only for a change of probe PM–10, and with changes of printing paper and the like.

Having calibrated the instrument, the negative 206 is placed adjacent condensor lenses 202 and 200 on holder 212 and the image of the negative projected on the easel 120. In order to analyze the color balance discrepancy in this colored negative 206, the three lights red, green and blue are successively passed through the optical system and densities of selected areas of the negative, when separately exposed to red, blue and green lights, are determined. As will now be explained, these densities are determined for the toe and shoulder portions of the H and D curves of the negative and then the intensities of the various colored projection lights are adjusted so that the three H and D curves for the red, blue and green are moved to give the desired balance of color exposure.

FIGS. 6*a*, 6*b*, 6*c* and 6*d* show hypothetical H and D curves which will be used in explaining the method of this invention and the operation of the apparatus. H and D curves are well-known and it should be understood that every color negative has density characteristics represented by H and D curves. For a treatise on H and D curves reference is made to the book entitled "Principles of Color Photography" published for Eastman Kodak Company by John Wiley and Sons, Inc., 1953. An H and D curve plots the log of exposure to log of density. The density is measured in units which is an arbitrary term used in the field of color photography and is an inverse of the light flux transmitted through the portion of the negative. These H and D curves normally vary in vertical position on the graph, and normally vary in slope in the central portion of the curve. However, unless something drastic has happened with the negative, these curves do not normally contain humps or kinks but rather the central portion is essentially a straight line located between the lower flattened out "toe" end and the upper flattened out "shoulder" end. In selecting "light" areas on the projected negative image, it is easy to select a density value falling on the "toe" since the density varies only slightly here. The same is true for the "shoulder."

The location of these "toe" region values of these H and D curves for the three colors enables one to determine the spacing of these curves at the low density region. In order to make an accurate mental evaluation of the discrepancy of these curves without being able to plot the complete curves, i.e. to evaluate the displacement of them from each other, either the "toe" or "shoulder" should be made to coincide so that the differences between the other end can be readily ascertained. Once the differences are known, the curves can be vertically shifted to make them coincide in an optimum manner in the same region of the graph. Since their slopes are normally different from each other, they can usually just be made to cross at some particular point on the exposure range. The ideal situation would be to cause all three curves to coincide overall. This would be a perfect color balance situation for all exposure ranges of the negative. However, since they are of different slope, one must select a particular portion of the curves to cross in order to get optimum color balance at that region.

Now referring back to the apparatus and its operation, switch SW–1 is placed in position 4 to project white light on film 206 from all three lamps. While the negative is projected on the easel by the white light, probe PM–10 is placed over a lightest area of the image which is projected on the easel 120. This lighest area corresponds to the deepest shadow area of the image photographed, and represents the least amount of density difference at the toe area of the H and D curves. The probe is left at this position while relative densities of the three colors are determined and the H and D curves are adjusted as will now be described. In FIGS. 5*a–d* are illustrated the successive meter readings on the dial of the meter M–20 for the following steps of the operation. The values chosen are arbitrary, since these will vary greatly with the particular negative analyzed.

While probe PM–10 is in this position and the three colored sources are at 100% intensity, and the lens diaphragm 104 is wide open, switch SW–1 is indexed through positions 1, 2 and 3 to determine which of the three densities is closest to zero as shown by FIG. 5*a*. The color closest to zero, in this case red, is brought to zero by closing down diaphragm 104, while the switch SW–1 is in position 1. This moves all the curves upwardly but leaves the relative densities of green and blue below zero on the meter as shown by dotted lines $g_1$, $b_1$, and $r_1$ in FIG. 5*a*.

The green and blue H and D curves are then moved upwardly so as to make all the toe portions coincide at zero density. This is accomplished by indexing switch SW–1 to position 2 and then reducing the green intensity by means of variable transformer VT–G. Next, switch SW–1 is indexed to position 3 and the blue light intensity reduced by means of variable transformer VT–B. FIG. 6*a* shows hypothetical H and D curves before any adjustment (readings *g*, *b*, *r* of FIG. 5*a*) and FIG. 6*b* shows the curves after the "toe adjustment" when the relative densities at one point on the toe portion reads zero on the meter.

Now the differences between the curves can be readily evaluated by measuring the differences at the "shoulder" portions of the curves. These shoulder portion readings as illustrated graphically in FIG. 6*b* are easily obtained from meter M–20 by first placing switch SW–1 on position 4 to activate all three lights and placing probe PM–10 on the darkest or high light area of the projected image on easel 120.

While probe PM–10 is in this high light portion and the colored light sources are at the intensities and setting previously determined, and with the lens diaphragm at its previous setting, the switch SW–1 is again indexed through positions 1, 2 and 3 to determine which color has a density reading closest to 1.2 density units. These readings as shown by FIGS. 5*b* and 6*b* determine the relative slopes of the three curves and are specifically red (.9), blue (1.0) and green (1.1).

Now that the difference is known between the three curves, it is desired to coincide these curves as best as can be for the particular type of reproduction desired from the negative. In other words, this analysis clearly indicates the degree of lack of color balance condition of the three primary colors in this negative involved. To produce a better print than the negative, and in fact the optimum print that can be had from the negative, the three H and D curves must be brought into their closest relationship. If a general color balance is desired, the curves should be crossed generally at their center (i.e. 1½ exposure units). The light intensities of the various three bulbs can be varied to cause this balanced relationship. If, on the other hand, the pastel shades in the print resulting from the negative are of particular concern, the curves can be crossed closer to the shoulder portions, since the shoulder represents the pastel shades of a print made from this negative. Obviously, if the film 206 is a positive, the reverse will be true.

It has been found that to obtain an optimum print, the curves are not only crossed, but are moved toward the ideal of 1.2 in a manner to be described. Since the green curve shoulder has the highest value as illustrated in FIG. 6*b* when the toes are aligned, this relationship to the value of 1.2 units is the determining factor in the first adjustment. (Although log values are used here, this is only for purposes of convenience.) This first adjustment is made by moving all three curves simultaneously upwardly on the chart toward 1.2. This is achieved by "stopping down" lens diaphragm 204 to lessen the intensity of all light transmitted, including red, green and blue, to thus simulate an increase intensity value. This is done after placing switch SW–1 in position 2 using the green light as a criterion since its shoulder is the highest and is used for the criterion. If the curves are to be crossed in their centers, the green curve should be moved one-half the distance from 1.2 its present value of 1.1, i.e. to 1.15. Since the other curves are also moved simultaneously by stopping down the lens or the shutter 204. They all move 0.05 units as illustrated in FIGS. 5*c* and 6*c* to 1.05 for blue and 0.95 for red.

Next, the respective blue and red curves should be adjusted to obtain the central crossing. This is done by first moving the next closest blue curve up one-half the distance from its adjusted value of 1.05, as shown in FIG. 6*c*, half way to the adjusted value of the green curve of 1.15. This is done by placing switch SW–1 on position 3 to activate the blue light L–B and its variable transformer VT–B. By lowering the input voltage to lamp L–B with the variable transformer, the output intensity will be lowered, thereby causing the curve to be raised until a meter value reading of 1.112 is observed.

Next, the red curve is raised a distance of one-half the difference between its position at 0.95 and the adjusted green curve at 1.15. This is done by placing switch SW–1 in position 1 and adjusting variable transformer VT–R to lower the voltage input to the red source L–R until the density meter reads 1.05. When the shoulders of the curve are adjusted to these values, the curves will cross near the center of the exposure range, thereby giving a general optimum color balance of all three colors over the entire exposure range of that negative.

It will be realized that the colors projected from the three bulbs L–R, L–G, L–B, if projected simultaneously unto diffusor 350 and through the negative, will provide an optimum color balance condition for printing, no matter how poor the color balance originally was of the negative as illustrated on FIG. 6*a*. It will be realized that the respective red, green and blue H and D curves will not always assume the relationship illustrated in the figure. One or the other may be higher, the curves may be much more widely spaced from each other in an unbalanced situation, and the slopes may be somewhat different depending upon the negative. However, the general principles of analysis whereby one end of the three curves is located and aligned to obtain a measurable differential on the other end, and then the curves are shifted by adjusting the output of the respective sources and transmittence through the negative to obtain a crossing at any desired portion of the exposure range, will hold true no matter what the balance conditions of the negative.

Thus, it will be realized that there is provided a unique new method of analyzing and controlling the light transmittence through a negative. Not only can this analysis be made, but also printing may be achieved using the same analyzing apparatus after it is adjusted to obtain optimum color balance. In other words, after the adjustments have been made of shutter 204 and variable transformers VT–R, VT–G and VT–B to obtain optimum color balance of a light transmitted through the negative, then switch SW–1 is placed in position No. 4 to cause all three lamps to be activated simultaneously at their adjusted values to cause a composite light beam from opal diffusor 350. This opal diffusor which then is a secondary source, really acts as a primary source for the apparatus when printing. This printing is achieved by placing the three layer printing paper of conventional type on the easel and then projecting the composite pure and controlled light through negative 206, through enlarger lens 208 and on the print paper for a predetermined time interval. This time may be controlled with a suitable timer by a dial such as T–15 in FIG. 1. Obviously, this time interval may vary depending upon the enlarger conditions and the result desired. The print will be excellent value, having optimum balance in the selected region of the exposure.

Not only may the novel apparatus and method be utilized to obtain optimum prints and color analysis of negatives or positives, but also may be utilized to form a standard color chart as illustrated in FIG. 7. It will be realized that by adjustment of the variable lamp voltage transformers with respect to each other, any desired color may be achieved by various mixtures of the red, green and blue light projected unto the opal diffusor 350. After varying these transformers a large number of times and printing the resulting colors, a large number of color chips forming the cylindrical segments as illustrated in FIG. 7 are obtained. If each of these colors is identified by the voltage input, or light output of each of the respective lamps, each of these colors may again be reproduced at any time in the future merely by their identifying indicia. Furthermore, by utilizing one of these colors, for example, the standard gray illustrated at 502 in FIG. 7 and having an intensity of 14, a hue of zero and a value of zero, an entire range of the standard color chart may be reproduced at will by merely calibrating the instrument to this gray 502. Then using its voltage set up as standard, the voltage of the bulbs is varied by predetermined amounts to obtain the other colors. It will be realized that the apparatus and method is capable of actually achieving a universal color chart which can be standardized and reproduced at any time, merely from one of the identifying colors in the chart. (The term color here used is to include achromatic light such as white, gray and black.)

It will further be realized that many results can be obtained in the final print which can be produced from a negative. For example, in a color print having green grass, blue sky, flesh tones, and a red sweater, the color of the red sweater can be changed to any other desired color by merely controlling the bulbs. The potentialities of such equipment and method are practically unlimited. Many pages of further examples could be given but these are deemed to be superfluous since those skilled in the art will readily appreciate the possibilities upon studying the foregoing specification.

It is realized that the method and circuit herein may be altered somewhat to achieve the generally same results within the principles taught in this specification. Thus, the invention is not to be limited to the specific examples and illustrations and procedures which have been presented for explanatory purposes, but only by the principles set forth, especially as defined in the attached claims and the equivalents to those defined therein.

I claim:

1. A method of analyzing the color characteristics of a film and controlling primary color beam projection therethrough to obtain optimum color balance, comprising the steps of: successively projecting red, green and blue light beams through said film; measuring the density of the three colors in the light area of said film according to the amount of light transmitted therethrough; individually adjusting the amount of projected light of two of said colors to cause the three density readings to be substantially the same; measuring the density of the three colors in the high-light area of said film according to the amount of light transmitted therethrough to determine the highest high-light density reading uniformly lowering the amount of the three colors projected on said film to shift all three shadow readings toward a fixed value, said shift being a fraction of the original difference between the closest high-light density reading and said fixed value; lowering the intensity of the color having the next closest high-light color density reading to shift said next closest reading, said latter shift also being at said fraction of the distance from the original value of said next closest reading to said shifted value of said closest reading; and then lowering the intensity of the color having the lowest high-light density reading to shift said lowest reading toward said next closest reading, at said fraction of the difference between the original lowest reading and said shifted next reading, whereby said colors are brought into optimum balance for said negative.

2. A method of controlling the exposure by composite light formed of three primary colors, transmitted through a film to obtain optimum color balance, comprising the steps: projecting red, green and blue light successively unto said film; measuring the density of the three colors in the light area of said film according to the amount of light transmitted therethrough; individually adjusting the amount of projected light of two of said colors to cause the three density readings to be substantially the same; measuring the density of the three colors in the high-light area of said film according to the amount of light transmitted therethrough; adjusting the amount of two of the colors projected unto said film to shift the densities of said two colors, said two colors being those with the highest and lowest density when projected through the high-light area and the shift being in the direction of the density of said other third color to obtain optimum color balance of light transmitted through said film; and projecting unto said film the composite light composed of said adjusted red, green and blue light projected simultaneously, to thereby transmit light of optimum balance through said film.

3. A method of controlling the exposure by composite light formed of three primary colors transmitted through a film, to obtain optimum color balance, comprising the steps of: projecting red, green and blue light successively unto said film; measuring the density of the three colors in the light area of said film according to the amount of light transmitted therethrough and correlating these readings to the toes of three H and D curves for said transmitted colors; individually adjusting the amount of projected light of two of said colors to cause the three density readings to be substantially the same and thus align the toes of said curves; measuring the density of the three colors in the high-light area of said film according to the amount of light transmitted therethrough and correlating these readings to the shoulders of said H and D curves; adjusting the input of two of said lights again to shift the densities of said two colors, said two colors being those with the highest and lowest density when projected through the high-light area and the shift being in the direction of the density of said other third color to cause optimum color balance relationship between said three colors as represented by crossing of said H and D curves in a particular exposure region; and projecting through said film the composite light composed of said combined adjusted red, green and blue light, to thereby transmit light of optimum balance through said film.

4. A method of controlling the exposure by composite light formed of three primary colors transmitted through a film, to obtain optimum color balance, comprising the steps of: projecting red, green and blue light successively unto said film; measuring the density of the three colors in the light area of said film according to the amount of light transmitted therethrough; individually adjusting the amount of projected light of two of said colors to cause the three density readings to be subtantially the same; measuring the density of the three colors in the high-light area of said film according to the amount of light transmitted therethrough to determine the highest high-light density reading; uniformly lowering the amount of light of the three colors projected onto said film to shift all three high-light readings toward a fixed value, said shift being at a fraction of the original difference between the closest high-light density reading and said fixed value; lowering the intensity of the color having the next closest high-light color density reading to shift said next closest reading, said latter shift also being at said same fraction but of the distance from the original value of said next closest reading to said shifted value of said closest reading; and then lowering the intensity of the color having the lowest high-light density reading to shift said lowest reading toward said next closest reading, at said same fraction, but of the difference between the original lowest reading and said shifted next reading, whereby said colors are brought into optimum balance for said film; and then projecting unto said film, light composed of said red, green and blue adjusted lights projected simultaneously to thereby transmit light of optimum balance through said film.

References Cited

UNITED STATES PATENTS

| | | | |
|---|---|---|---|
| 1,894,808 | 1/1933 | Witte | 88—14 |
| 2,446,112 | 7/1948 | Simmon et al. | 88—14 |
| 2,561,243 | 7/1951 | Sweet | 88—24 |
| 2,842,025 | 7/1958 | Craig | 88—24 |
| 2,997,389 | 8/1961 | Boon | 96—23 |
| 3,011,388 | 12/1961 | Baumbach et al. | 88—14 |
| 3,067,649 | 12/1962 | Szymczak | 88—23 |
| 3,199,402 | 8/1965 | Hunt et al. | 88—14 |

JEWELL H. PEDERSEN, *Primary Examiner.*

A. A. KASHINSKI, T. L. HUDSON,

*Assistant Examiners,*